United States Patent
Gaillard

(10) Patent No.: US 9,022,294 B2
(45) Date of Patent: May 5, 2015

(54) PORTABLE ELECTRONIC DEVICE AND METHOD FOR ALTERNATE DATA CONVEYANCE OPERATIONS RESPONSIVE TO AN INVARIABLE ACTIVATION COMMAND

(75) Inventor: Joel Gaillard, Nassau (BS)

(73) Assignee: G. Holdings Ltd., Nassau NP (BS)

( * ) Notice: Subject to any disclaimer, the term of this patent is extended or adjusted under 35 U.S.C. 154(b) by 768 days.

(21) Appl. No.: 12/603,085

(22) Filed: Oct. 21, 2009

(65) Prior Publication Data

US 2010/0038436 A1 Feb. 18, 2010

Related U.S. Application Data

(63) Continuation-in-part of application No. 10/552,912, filed as application No. PCT/IB03/01523 on Apr. 14, 2003, now Pat. No. 7,628,333.

(51) Int. Cl.
| | |
|---|---|
| H04M 1/00 | (2006.01) |
| G06K 19/073 | (2006.01) |
| G06K 17/00 | (2006.01) |
| G06K 19/07 | (2006.01) |
| G06K 19/077 | (2006.01) |

(52) U.S. Cl.
CPC ...... *G06K 19/07345* (2013.01); *G06K 17/0022* (2013.01); *G06K 19/0723* (2013.01); *G06K 19/07354* (2013.01); *G06K 19/07703* (2013.01); *G06K 19/07769* (2013.01)

(58) Field of Classification Search
USPC .......................... 235/492, 487; 455/550.1, 557
See application file for complete search history.

(56) References Cited

U.S. PATENT DOCUMENTS

| | | | |
|---|---|---|---|
| 4,746,787 A | 5/1988 | Suto et al. | |
| 4,800,255 A | 1/1989 | Imran | |

(Continued)

FOREIGN PATENT DOCUMENTS

| | | |
|---|---|---|
| DE | 4203748 | 8/1993 |
| DE | 4205556 | 8/1993 |

(Continued)

*Primary Examiner* — Daniel Hess
(74) *Attorney, Agent, or Firm* — Fraser Clemens Martin & Miller LLC; James D. Miller

(57) ABSTRACT

The portable electronic device includes an electronic circuit, a control device operatively linked to the electronic circuit, first and second data transceivers operatively linked to the electronic circuit, a cue receiver operatively linked to the electronic circuit, a data conveyance switching element operatively linked to the electronic circuit and capable of being in either one of a first and a second state, and power means for providing power to the portable electronic device. The method of data conveyance includes awaiting for an activation cue to be received at the cue receiver; if an activation cue is received at the cue receiver, assigning its first state to the switching element, while if no activation cue is received at the cue receiver, assigning its second state to the switching element; and selectively triggering the control device to issue an invariable activation command. Upon the control device being triggered, if the switching element is in its first state, first data will be forwarded to the first data transceiver for initiating a data exchange operation with a first external data exchange device; while if the switching element is in its second state, second data will be forwarded to the second data transceiver for initiating a data exchange operation with a second external data exchange device.

20 Claims, 4 Drawing Sheets

(56) References Cited

U.S. PATENT DOCUMENTS

| | | |
|---|---|---|
| 5,590,038 A | 12/1996 | Pitroda |
| 5,734,154 A | 3/1998 | Jachimowicz et al. |
| 5,917,754 A | 6/1999 | Pathak et al. |
| 5,999,713 A | 12/1999 | Reiner et al. |
| 6,044,470 A | 3/2000 | Kuriyama |
| 6,112,987 A | 9/2000 | Lambert et al. |
| 6,254,001 B1 | 7/2001 | Chan |
| 6,257,486 B1 * | 7/2001 | Teicher et al. ............... 235/380 |
| 6,360,954 B1 | 3/2002 | Barnardo |
| 6,390,373 B1 | 5/2002 | Beyer et al. |
| 6,402,039 B1 | 6/2002 | Freeman et al. |
| 6,454,172 B1 | 9/2002 | Maeda et al. |
| 6,454,173 B2 | 9/2002 | Graves |
| 6,726,099 B2 * | 4/2004 | Becker et al. ................ 235/380 |
| 7,024,385 B1 | 4/2006 | Adcock et al. |
| 2003/0019942 A1 | 1/2003 | Blossom |
| 2003/0132301 A1 * | 7/2003 | Selker .......................... 235/487 |

FOREIGN PATENT DOCUMENTS

| | | |
|---|---|---|
| DE | 101 46 804 | 4/2003 |
| EP | 0945828 A2 | 9/1999 |
| WO | WO 03/027949 A1 | 4/2003 |

* cited by examiner

PORTABLE ELECTRONIC DEVICE AND METHOD FOR ALTERNATE DATA CONVEYANCE OPERATIONS RESPONSIVE TO AN INVARIABLE ACTIVATION COMMAND

CROSS REFERENCE DATA

This patent application is a continuation in part of U.S. patent application Ser. No. 10/552,912 filed on Feb. 27, 2006, which is an entry into national phase of International PCT application No. PCT/IB2003/001523 filed on Apr. 14, 2003.

FIELD OF THE INVENTION

This invention relates to a portable electronic device capable of alternate data conveyance operations responsive to an invariable activation command.

BACKGROUND OF THE INVENTION

Conventional portable electronic or magnetic devices are used for many different applications. Such portable devices can be for example access devices such as keycards, identification devices, or credit or debit devices such as the so-called smart cards.

Electronic identification devices are widely used by banks, credit companies, stores, to allow automated monetary transactions without the assistance of a bank teller.

For conventional credit cards, a magnetic strip is encoded with a small amount of coded information identifying the cardholder, such as an identification code and a personal identification number (PIN). To access the information held by such cards after or during a transaction, a suitable transaction interface machine comprising an appropriate magnetic card reader is required. Transaction or other account-related information can be outputted on a display screen located on the transaction machine.

Some prior art identification or transaction cards incorporate greater storage capacity and data processing means in the form of a microchip carried by the plastic main body of a smart card. These smart cards can store more data than standard magnetic cards. These cards, however, still require the use of a card reader interface machine to access the information comprised thereon, and a supplementary screen on the interface machine is required to view their content.

Some prior art identification cards have been provided with an in-built display screen and an information decoder cooperating with each other to access, decode and visualize coded information comprised in a memory unit located on the card. These prior art devices, however, necessitate multiple controls thereon to accomplish different functions of the card.

SUMMARY OF THE INVENTION

The present invention relates to a portable electronic device, comprising:
  an electronic circuit capable of storing data therein, capable of processing data, and capable of data input and output;
  a control device operatively linked to said electronic circuit, with an invariable activation command being issued when said control device is triggered;
  a user interface device operatively linked to said electronic circuit;
  a data transceiver operatively linked to said electronic circuit;
  a cue receiver for receiving a selectively emitted activation cue from a source external to said portable electronic device;
  a data conveyance switching element operatively linked to said electronic circuit, said switching element being in an activated state upon an activation cue having been received by said cue receiver, and being in an inactive state when no activation cue was received by said cue receiver; and
  power means for providing power to said portable electronic device;
wherein upon said control device being selectively triggered to issue said invariable activation command:
  if said switching element is in said activated state, a data exchange will be initiated through the instrumentality of said data transceiver for exchanging data behveen said electronic circuit and an external data exchange device;
  if said switching element is in said inactive state, data will be conveyed from said electronic circuit to said user interface device for communicating information to the portable electronic device holder.

In one embodiment, said user interface device is a display screen.

In one embodiment, wherein said data transceiver comprises a data transmitter and a data receiver distinct from said data transmitter.

In one embodiment, said cue receiver is said data receiver.

In one embodiment, said control device is a biometric parameter detector, such as a fingerprint scanner capable of obtaining a fingerprint scan, whereby said control device is triggered when the fingerprint scan matches a fingerprint image pre-saved in said electronic circuit.

In one embodiment, said control device is a button, and said control device is triggered when the button is pressed.

In one embodiment, said electronic circuit comprises said switching element.

In one embodiment, said electronic circuit comprises a microchip, and wherein said switching element is a series of instructions programmed onto said microchip.

In one embodiment, said switching element comprises a decisional logical circuit.

The invention also relates to a data exchange system comprising:
  a data exchange device comprising a first electronic circuit, a first data transceiver and a cue emitter; and
  a portable electronic device, comprising:
    a second electronic circuit capable of storing data therein, capable of processing data, and capable of data input and output;
    a control device operatively linked to said electronic circuit with an invariable activation command being issued when said control device is triggered;
    a user interface device operatively linked to said electronic circuit;
    a second data transceiver operatively linked to said electronic circuit;
    a data conveyance switching element operatively linked to said electronic circuit, said switching element being in an activated state upon an activation cue having been received by said cue receiver, and being in an inactive state when no activation cue was received by said cue receiver;
    and
    power means for providing power to said portable electronic device;
  wherein upon said control device being selectively triggered to issue said invariable activation command:

if said switching element is in its activated state, a data exchange will occur between said first data transceiver and said second data transceiver, thereby exchanging data between said data exchange device and said portable electronic device;

if said switching element is in its inactive state, data is forwarded to said user interface device for communicating information to the portable electronic device holder.

The invention further relates to a portable electronic device comprising:

an electronic circuit capable of storing data therein, capable of processing data, and capable of data input and output;

a control device operatively linked to said electronic circuit, with an invariable activation command being issued when said control device is triggered;

first and second data conveyance functions programmed in said electronic circuit;

a cue receiver for receiving a selectively emitted activation cue from a source external to said portable electronic device; and power means, for providing power to said portable electronic device;

wherein upon said control device being selectively triggered to issue said invariable activation command, said electronic circuit will accomplish said first data conveyance function if an activation cue was received by said cue receiver and said second data conveyance function if no cue was received by said cue receiver.

The invention also relates to a method for data exchange with a portable electronic device of the type comprising: an electronic circuit capable of storing data therein, capable of processing data, and capable of data input and output, a control device operatively linked to said circuit, a user interface device operatively linked to said circuit, communication ports operatively linked to said circuit, a switching element operatively linked to said electronic circuit and being in a default inactive state, and power means for providing power to said portable electronic device, said method comprising the steps of:

awaiting for an activation cue to be received at a predetermined one of said communication ports;

if an activation cue is received at one of said communication ports, changing the state of said switching element from its default inactive state to an activated state; and selectively triggering said control device to issue an invariable activation command, whereby said method will further comprise one of the two following steps:

if said switching element is in its activated state, initiating a data exchange with an external data exchange device through at least one of said communication ports; and if said switching element is in its inactive state, conveying data from said electronic circuit to said user interface device for communicating is information to the portable electronic device holder.

In one embodiment, said activation cue is received at one of said communication ports distinct from another one of said communication ports used for data exchange with the external data exchange device.

In one embodiment the additional following step occurs after selectively triggering said control device if said switching element is in said activated state:

conveying data from said electronic circuit to said user interface device for communicating information to the portable electronic device holder.

The present invention also relates to a portable electronic device, comprising:

an electronic circuit capable of storing data therein, capable of processing data, and capable of data input and output;

a control device operatively linked to said electronic circuit, with an invariable activation command being issued when said control device is selectively triggered;

a first data transceiver operatively linked to said electronic circuit, said first data transceiver being for exchanging data between said electronic circuit and a first external data exchange device;

a second data transceiver operatively linked to said electronic circuit, said second data transceiver being for exchanging data between said electronic circuit and a second external data exchange device;

a cue receiver operatively linked to said electronic circuit for receiving an activation cue from a source external to said portable electronic device;

a data conveyance switching element operatively linked to said electronic circuit, said switching element being assigned a first state upon an activation cue having been received by said cue receiver, and being assigned a second state when no activation cue was received by said cue receiver;

and power means for providing power to said portable electronic device;

wherein upon said control device being selectively triggered to issue said invariable activation command:

if said switching element is in said first state, a first data conveyance operation will be initiated through the instrumentality of said first data transceiver for sending data from said electronic circuit to the first external data exchange device; and if said switching element is in said second state, a second data conveyance operation will be initiated through the instrumentality of said second data transceiver for sending data from said electronic circuit to the second external data exchange device.

In one embodiment, the portable electronic device further comprises a display screen operatively linked to said electronic circuit.

In one embodiment, said first data transceiver includes said cue receiver.

In one embodiment, said control device is one of a manually activated button, a keypad for receiving a PIN code, a biometric parameter detector and a combination thereof.

In one embodiment, said electronic circuit includes said switching element.

In one embodiment, said electronic circuit comprises a microchip, and wherein said switching element is a series of instructions programmed onto said microchip.

In one embodiment, said switching element comprises a logical circuit.

In one embodiment, said first data transceiver comprises a proximity transceiver for accomplishing a wireless data exchange with a nearby first external data exchange device through a direct link.

In one embodiment, said second data transceiver comprises a communication network transceiver for wireless communication through a communication network with one of a remote portable electronic device, a remote server; a remote terminal and a combination thereof.

The invention also relates to a portable electronic device comprising:

an electronic circuit capable of storing data therein, capable of processing data, and capable of data input and output;

a control device operatively linked to said electronic circuit, with an invariable activation command being issued when said control device is triggered;

first and second data conveyance operations programmed in said electronic circuit;

first and second data transceivers operatively linked to said electronic circuit;

a cue receiver operatively linked to said electronic circuit for receiving an activation cue from a source external to said portable electronic device; and power means, for providing power to said portable electronic device;

wherein upon said control device being selectively triggered to issue said invariable activation command:

if an activation cue was received by said cue receiver, said electronic circuit will accomplish said first data conveyance operation to convey data from said electronic circuit to said first data transceiver for transmitting data through said first data transceiver; and if no activation cue was received by said cue receiver, said electronic circuit will accomplish said second data conveyance operation to convey data from said electronic circuit to said second data transceiver for transmitting data through said second data transceiver.

The present invention further relates to a data exchange system comprising:

a first data exchange device;

a second data exchange device; and a portable electronic device, comprising:

an electronic circuit capable of storing data therein, capable of processing data, and capable of data input and output;

a control device operatively linked to said electronic circuit, with an invariable activation command being issued when said control device is selectively triggered;

a first data transceiver operatively linked to said electronic circuit, said first data transceiver being for exchanging data between said electronic circuit and said first data exchange device through a direct link;

a second data transceiver operatively linked to said electronic circuit, said second data transceiver being for exchanging data between said electronic circuit and said second data exchange device through a communication network;

a cue receiver for receiving an activation cue from said first data exchange device;

a data conveyance switching element operatively linked to said electronic circuit, said switching element being assigned a first state upon an activation cue having been received by said cue receiver, and being assigned a second state when no activation cue was received by said cue receiver; and power means for providing power to said portable electronic device;

wherein upon said control device being selectively triggered to issue said invariable activation command:

if said switching element is in said first state, a first data conveyance operation will be initiated through the instrumentality of said first data transceiver for exchanging data between said electronic circuit and the first external data exchange device;

if said switching element is in said second state, a second data conveyance operation will be initiated through the instrumentality of said second data transceiver for exchanging data between said electronic circuit and the second external data exchange device.

The invention also relates to a method for data conveyance with a portable electronic device of the type comprising: an electronic circuit capable of storing data therein, capable of processing data, and capable of data input and output, a control device operatively linked to said electronic circuit, first and second data transceivers operatively linked to said electronic circuit, a cue receiver operatively linked to said electronic circuit, a data conveyance switching element operatively linked to said electronic circuit and capable of being in either one of a first and a second state, and power means for providing power to said portable electronic device, said method comprising the steps of:

awaiting for an activation cue to be received at said cue receiver;

if an activation cue is received at said cue receiver, assigning said first state to said switching element, while if no activation cue is received at said cue receiver, assigning said second state to said switching element; and selectively triggering said control device to issue an invariable activation command whereby:

if said switching element is in said first state, forwarding first data to said first data transceiver for initiating a data exchange operation with a first external data exchange device; and if said switching element is in said second state, forwarding second data to said second data transceiver for initiating a data exchange operation with a second external data exchange device.

In one embodiment, the method further comprises the following step before the step forwarding first data to said first data transceiver for initiating a data exchange operation with a first external data exchange device:

forwarding third data to and displaying said third data on a display screen provided on said portable electronic device, wherein said third data is representative of the content of said first data.

In one embodiment, after the step of forwarding said third data to the display screen, the method comprises the following step:

awaiting for an authorization command to be inputted through a user confirmation input device provided on said portable electronic device before forwarding said first data to said first data transceiver.

In one embodiment, the method further comprises the following steps before the step forwarding second data to said second data transceiver for initiating a data exchange operation with a second external data exchange device:

forwarding fourth data to and displaying said fourth data on said display screen, wherein said fourth data is representative of the content of said second data; and awaiting for an authorization command to be inputted through said user confirmation input device before forwarding said second data to said second data transceiver.

In one embodiment, said control device includes said user confirmation input device.

In one embodiment, said first and second data are identical.

In one embodiment, said first data transceiver is a proximity transceiver and the step of forwarding said first data to said first transceiver is for initiating a wireless data exchange operation with a proximate first external data exchange device through a direct link.

In one embodiment, said second data transceiver is a communication network transceiver and the step of forwarding said second data to said second data transceiver is for initiating a wireless data conveyance operation through a communication network with one of a remote portable electronic device, a remote server, a remote terminal and a combination thereof.

In one embodiment, the step of selectively triggering said control device to issue an invariable activation command comprises selectively triggering one of a manually activated button, a keypad for receiving a PIN code, a biometric parameter detector and a combination thereof.

DETAILED DESCRIPTION OF THE EMBODIMENTS

Figure 1:
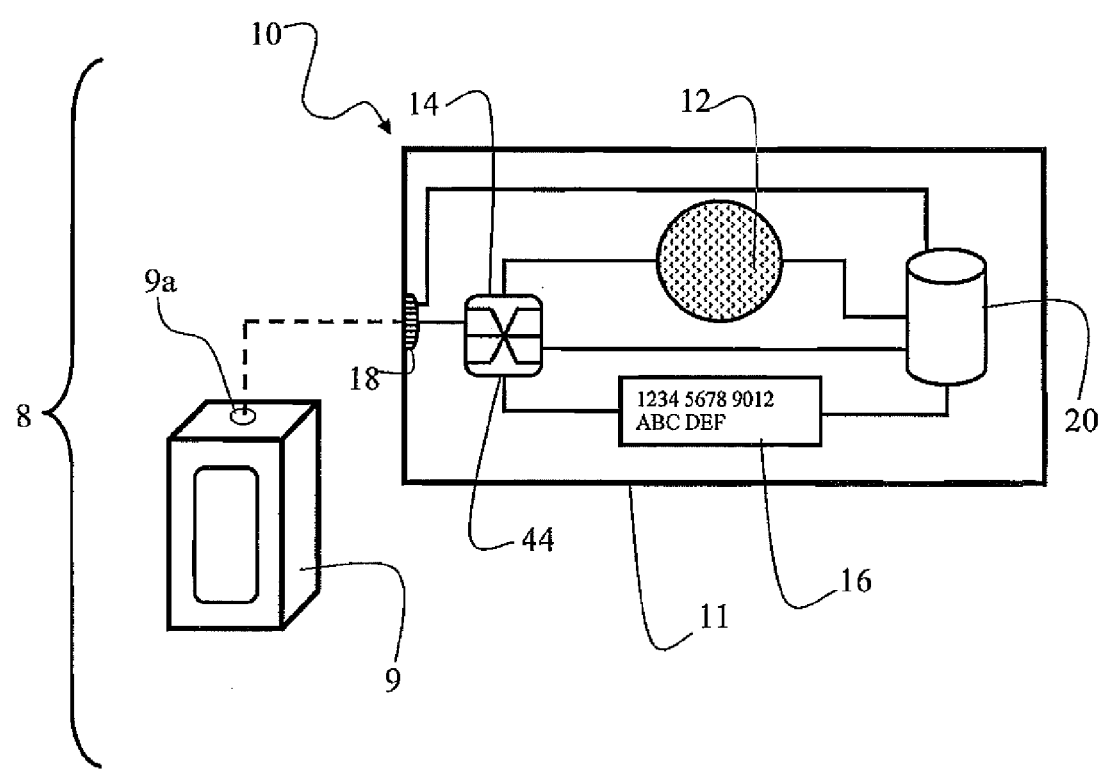
FIG. 1 is a schematic view of a data exchange system, showing a portable electronic device according to one embodiment of the present invention and a data exchange device, and further suggesting in dotted lines a communication link being established between the portable electronic device and the data exchange device.

FIG. 1 shows a data exchange system 8 comprising a portable electronic device 10 according to the present invention and a data exchange device 9. Portable electronic device 11 can be used for example for monetary transactions or identification purposes.

Device 10 comprises a rigid or semi-rigid main body 11 on which are operatively mounted: a control device 12, an electronic circuit 14, a display screen 16, a transceiver 18 and power means 20. Main body 11 can be made from a plastic material for example.

Figure 2:
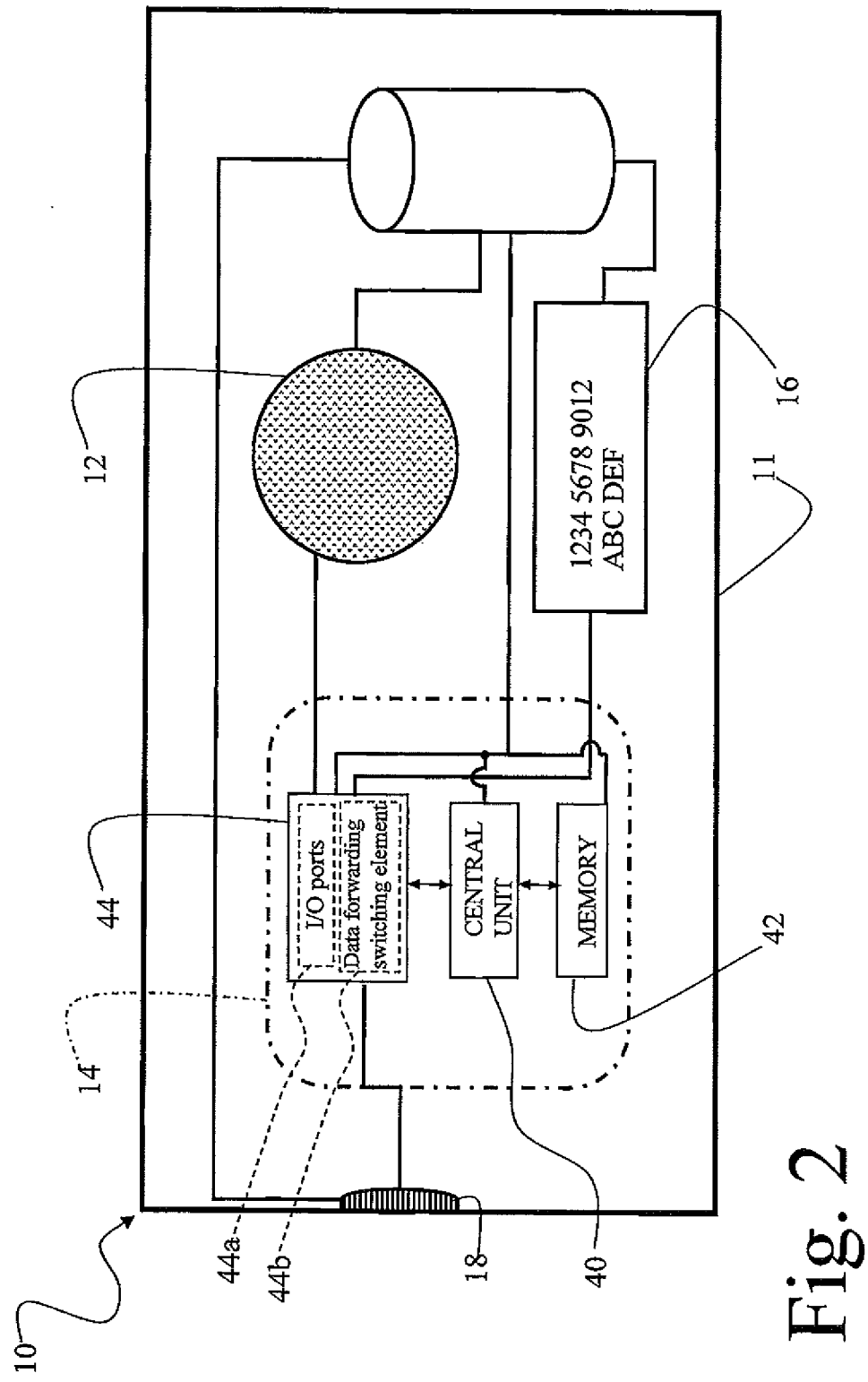
FIG. 2 is an enlarged schematic view of the portable electronic device of FIG. 1, showing the electronic circuit thereof in greater detail.

As illustrated in FIG. 2, electronic circuit 14 comprises a central unit 40 cooperating with a memory unit 42 and an Input/Output (I/O) controller 44. I/O controller 44 comprises I/O ports 44a and a data forwarding switching element 44b. I/O ports 44a handle the inputting and outputting of the data, and switching element 44b directs the data flow towards an appropriate destination, as detailed hereinafter.

Central unit 40 is operatively linked to I/O controller 44, Central unit 40 is able to process data electronically stored in memory unit 42, and is further capable of storing data thereon. Central unit 40 collaborates with I/O controller 44, and is capable of processing data incoming therefrom and of sending data thereto in order for this data to be appropriately outputted to components operatively connected to I/O controller 44.

Memory unit 42 of circuit 14 can comprise pre-stored data thereon. For example, this pre-stored data may comprise data related to the cardholder, such as the cardholder's name, address, his bank balance, his date of birth, or any other desired information. In one embodiment, the pre-stored data can further comprise validation data about the cardholder that will be used to authenticate the user, for example a personal identification number (PIN) or a fingerprint image. In another embodiment, the pre-stored data comprises electronic money usable to purchase goods and services according to known electronic wallet transaction methods.

Electronic circuit 14 comprises three essential functions: processing data, storing data, and inputting and outputting data to other components. The diagram of FIG. 2 shows a specific layout of operational blocks comprised within electronic circuit 14 and cooperating with each other to provide these three functions thereto. It is understood that alternate schematic circuit layouts could illustrate these three functions without departing from the scope of the present invention.

Electronic circuit 14 is operatively connected through the instrumentality of its I/O controller 44 to control device 12, screen 16 and transceiver 18.

In one embodiment, electronic circuit 14 is a programmable microchip, as found on smart cards.

Screen 16 is capable of displaying information transferred thereto from electronic circuit 14 through the instrumentality of I/O controller 44. Display screen 16 can be a LCD (liquid crystal display) screen embedded into main body 11 of the device.

In one embodiment of the present invention, screen 16 is replaced with another user interface device, for example a speaker with voice emission software which would transform information forwarded thereto to speech understandable by the portable electronic device holder.

Figure 3:
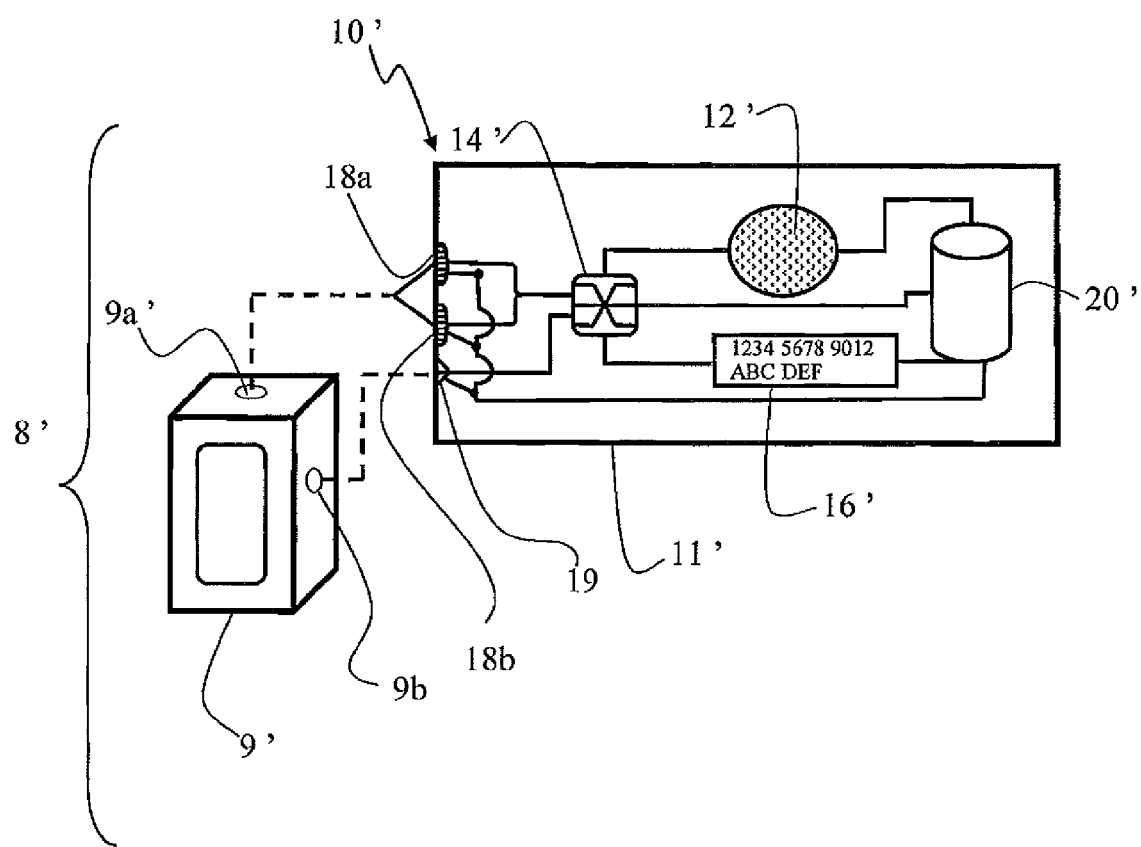
FIG. 3 is a view similar to FIG. 1, but showing a portable electronic device according to an alternate embodiment of the present invention cooperating with an alternate corresponding data exchange device.

Control device 12 can be any suitable device allowing the portable electronic device holder to selectively trigger a data conveyance operation as detailed hereinafter. Control device 12 can be for example a single manually activated button provided on the portable electronic device main body 11 (as schematically illustrated in FIGS. 1-3) which, when pressed, issues an activation command that triggers a particular data conveyance as described hereinbelow. Alternatively, control device 12 can include validation means such as a biometric parameter detector, for example a fingerprint scanner capable of obtaining a fingerprint image, which can be compared by central unit 40 to a fingerprint image pre-saved in memory unit 42. A fingerprint image match would validate that the user of portable electronic device 10 is authorized to use the latter, and then trigger the data conveyance operation. In another alternate embodiment, control device 12 could include validation means in the form of a keypad allowing the portable electronic device holder to type in a personal identification number (PIN) which will be compared by central unit 40 to a PIN pre-saved in memory unit 42, with a PIN match validating the portable electronic device user and triggering the data conveyance operation. In yet another embodiment, control device 12 is a validation button required to be pressed and on which a fingerprint scanner is provided: the card holder may thus concurrently apply his fingerprint on the scanner and press on the button to respectively validate and trigger the data conveyance operation. Any other suitable control device may be used.

Generally, control device 12 is considered to be triggered when the portable electronic device bolder has successfully accomplished the necessary steps for control device 12 to issue an activation command, for example when the PIN or fingerprint scan was authenticated, or when the validation button was pressed, or when the button was pressed while the fingerprint scan was authenticated.

In an alternate embodiment of the present invention, control device 12 and LCD screen 16 can be replaced with a single touch-screen display, whereby information can be outputted, and whereby validation information can be captured.

As illustrated in FIG. 1, a communication link can be established between the electronic device transceiver 18 and the transceiver 9a of data exchange device 9. Data exchange device 9 can be any sort of data exchange device comprising an electronic circuit (not shown) therein and a data transceiver 9a therein able to cooperate with transceiver 18 of device 10. In one embodiment, data exchange device 9 is another portable electronic device 10. Data exchange device 10 can alternately be a computer, an interface machine such as an automatic teller machine, or any other suitable data exchange device.

The communication link can be a contact or contactless link, for example an infrared or radio wave communication link. Thus, the electronic device transceiver 18 can be any suitable emitting and receiving device capable of communication with the data exchange device transceiver 9a. In an embodiment wherein circuit 14 is a microchip similar to the ones found on smart cards, transceiver 18 could include a series of electrical contacts located on the surface of the microchip destined to cooperate with a corresponding type of electronic device reader, as known in the art.

Transceiver 18 is also a cue receiver, whereby an activation cue can be received by electronic device 10 from data exchange device transceiver 9a. This activation cue is in the form of a data communication of a specific type which will be recognized by electronic device 10 as an activation cue, for example a predetermined bit sequence.

Switching element 44b can be any type of device allowing data to be conveyed according to alternate data conveyance operations in response to an activation cue being received by transceiver 18 or not, as described hereinafter. According to the embodiment shown in FIGS. 1 and 2, electronic circuit 14 comprises switching element 44b. In an embodiment wherein electronic circuit 14 comprises a microchip, switching element 44b can be a series of instructions programmed onto the microchip whereby the data conveyance operation will be automatically executed according to whether or not an activation cue was received by transceiver 18. Alternately, switching element 44b can comprise a decisional logical circuit. Generally, switching element 44b can be a physical structure, a virtual program, or both.

According to the invention, at any given time, switching element 44b will consequently be in either one of the two following states:
a) an activated state wherein an activation cue was received by transceiver 18; or,
b) an inactive state wherein no activation cue was received by transceiver 18.

By default, switching element 44b is in its inactive state.

Power means 20 can be any type of power source suitable for providing power to the portable electronic device components that require power, or for receiving power from an external source to re-distribute it to the portable electronic device components that require power. For example, power means 20 can be a battery, or a connector destined to be engaged by a corresponding external connector linked to a power source.

In the embodiment of FIGS. 1-2, power means 20 is illustrated as being connected to all the portable electronic device components; it will be obvious for those skilled in the art that power means 20 could be connected only to one or a few components that require a power source to operate, depending on the exact nature of portable electronic device 10 and of each of its components.

In use, upon control device 12 being selectively triggered by the portable electronic device holder, an activation command will be issued by control device 12 to electronic circuit 14, in reaction to which data will be conveyed within portable electronic device 10, and possibly additionally conveyed to and from portable electronic device 10, according to a predetermined data conveyance operation. The exact nature of this data conveyance operation will depend on the state of switching element 44b.

More particularly, if no activation cue is received by portable electronic device 10, then switching element remains in its inactive state. Upon control device 12 being to selectively triggered by the portable electronic device bolder, data will be forwarded from electronic circuit 14 to user interface device 16, for communicating information to the portable electronic device holder.

However, upon an activation cue being received by portable electronic device 10, switching element 44b switches to its activated state. If control device 12 is selectively triggered by the portable electronic device holder while switching element 44b is in this activated state, a data exchange will be initiated between portable electronic device 10 and the external data exchange device 9. This data exchange may be in the form of a data download from electronic device 10 to data exchange device 9, of a data upload to electronic device 10 from data exchange device 9, or of a data download and a data upload—with this last alternative being the most likely in many applications.

Thus, upon control device 12 being selectively triggered to issue an activation command by the portable electronic device holder, one of two alternate data conveyance operations will be initiated within portable electronic device 10. In the case where no activation cue was received by portable electronic device 10, data will be communicated to the portable electronic device holder by means of user interface device 16. However, if an activation cue was previously received by portable electronic device 10, a data exchange will be initiated between portable electronic device 10 and data exchange device 9.

It is noted that, according to the present invention, the activation command issued when control device 12 is triggered, is an invariable activation command. That is to say that the portable electronic device holder will not be able to select to issue different activation commands by means of control device 12 depending on whether the user considers that a data exchange operation should be accomplished with an external data exchange device 9, or whether the user wishes to display information on screen 16 on the basis of data stored in memory 42. The same invariable activation command will thus be issued upon control device 12 being triggered, and it is the state of switching element 44b, resulting from the receipt or non-receipt of an activation cue by portable electronic device 10, that will be decisive as to the type of data conveyance that will occur.

It is further noted that the above-mentioned triggering of control device 12 may comprise a single step, such as pressing a single button, or more than one step, such as pressing a button and concurrently applying one's fingerprint on a fingerprint scanner provided over the button, or typing in a PIN on a keypad provided on the portable electronic device. However, this control device triggering operation is accomplished in a same manner notwithstanding whether a data exchange between portable electronic device 10 and an external data exchange device 9 is to be accomplished, or whether a data conveyance occurs exclusively within portable electronic device 10, between electronic circuit 14 and screen 16. Consequently, it can be said that control device 12 will issue an invariable activation command when it is triggered, even if control device 12 may include more than one button, biometric parameter detector, etc. . . . that need to be concurrently or sequentially activated for control device 12 to issue a single, invariable activation command. Of course, this single invariable activation command will trigger alternate data conveyance operations responsively to the reception or non-reception of an activation cue, so ulterior alternate commands within electronic circuit 14 will occur depending on the data conveyance operation type, but the initial activation command will not depend on the reception or non-reception of an activation cue.

One example of a particular application of the present invention is the use of a portable electronic device 10 as a quick payment means, such as for paying public transportation fares. In such a case, data exchange device 9 would represent the payment debit machine, and portable electronic device 10 would be a payment card with pre-stored electronic money thereon. When the cardholder would want to use the public transportation services, he would approach the area of access to public transportation where a debit machine 9 would be provided. Debit machine 9 would continuously, or at regular time intervals, or when prompted to do so, emit an activation cue in the form of a predetermined contactless data transmission. Upon the cardholder approaching his payment card within a range allowing it to receive the activation cue from the debit machine, he could then trigger his control device 12 whereby a data exchange in the form of an electronic money transaction would occur between the payment card 10 and the debit machine 9. This data exchange could include any type of information required for electronic money transactions, as known in the art. For example, the following data exchange could occur, in addition to the reception of the activation cue:

a message is sent from portable electronic device 10 to debit machine 9 to inquire as to the fare for passage;

the fare for passage is transferred from debit machine 9 to payment card 10;

after verification by the card electronic circuit 14 that the card memory 42 still stores a sufficient amount of electronic money, payment card 10 then sends a right-of-passage message to data exchange device 9; and debit machine 9 sends a confirmation of right-of-passage to payment card 10, the latter then debiting the passage fare from the total electronic money amount stored in the card memory 42. Debit machine 9 also sends the required information to an exterior passage control device to allow passage of the cardholder to the public transportation services.

If, on the other hand, control device 12 is triggered at any time when switching element 44b is in its inactive state, i.e. not within the activation cue emission range of a public transportation service debit machine 9, then data from electronic circuit 14 will be sent to display screen 16 to display the total amount of electronic money remaining in card memory 42. No data exchange with an external debit machine would then be attempted by card 10.

Thus, in the above example, upon triggering control device 12, an invariable activation command would be issued that would result in two different possible data conveyance operations: if an activation cue has been previously received from a nearby debit machine 9, payment for right-of-passage would be made to allow the cardholder to use the public transportation services; on the other hand, if no activation cue has been previously received from a debit machine 9, then verification of the electronic money amount stored on the card memory 42 would be made.

Portable electronic device 10 could also have a plethora of other alternate purposes. For example, portable identification device 10 could be used as an electronic passport. This passport, when its control device is triggered, could be used to transmit identification data of the electronic passport owner to a data exchange device 9 if an activation cue has been received by the electronic passport, or to simply display this information on the display screen of the electronic passport if no activation cue has been received by the electronic passport.

The present invention is thus particularly advantageous, in that the portable electronic device holder needs only trigger control device 12 to issue an invariable activation command, for either the data exchange or the data display to occur. By means of the switching element 44b and transceiver 18 acting as a cue receiver, both located on portable electronic device 10, the proper data conveyance within portable transaction device will occur automatically upon this invariable activation command being issued. Thus, no alternate controls need to be provided on the portable electronic device 10. However, in one embodiment, other controls could be provided on portable electronic device 10 for accomplishing additional actions with portable electronic device 10.

It is noted that the data downloaded to an external data exchange device 9 during a data exchange therewith, and the data conveyed internally from electronic circuit 14 to display screen 16, may be the same data (as is the case in the above example of the electronic passport) or different data (as is the case in the above example of the payment card), depending on the purpose of portable electronic device 10.

The state of switching element 44b may be reset to its default inactive state upon one or more pre-determined conditions being met. In the embodiment where electronic circuit 14 is a microchip, these conditions may be programmed therein. For example, electronic circuit 14 may send a reset command to switching element 44b at regular time intervals, or a certain amount of time after switching element 44b has switched to its activated state.

According to one embodiment when switching element 44b is in its activated state, upon selective triggering of control device 12, in addition to a data exchange occurring with an external data exchange device, an internal data conveyance from electronic circuit 14 to display screen 16 would also occur. Thus, according to this embodiment, an internal data conveyance would not be exclusive to the inactive state of switching element 44b, while a data exchange with an external data exchange device would be exclusive to the activated state of switching element 44b. In the above example of the payment card, this alternative of the invention would have the remaining amount of electronic money in the payment card displayed concurrently when a passage fare is paid with the card.

FIG. 3 shows an alternate data exchange system 8' comprising an alternate embodiment of a portable electronic device 10' and an alternate data exchange device 9', wherein elements that are similar to those of the first embodiment have primed reference numerals. Portable electronic device 10' includes a transceiver that comprises multiple communication ports, namely a data transmitter 18a, a data receiver 18b, and a cue receiver 19.

Data transmitter 18a and data receiver 18b could use distinct communication modes. For example, transmitter 18a could be a radio wave transmitter, and receiver 18b could be an infrared wave receiver.

Cue receiver 19, which is distinct from data receiver 18b in the embodiment of FIG. 3, can be of any type suitable for receiving an activation cue from data exchange device 9'. Data exchange device 9' is equipped with a corresponding cue emitter 9b. For example, cue emitter 9b can be a data transmission device emitting data by means of a different medium than that used by data receiver 18b—for example cue emitter 9b can emit radio waves while data transceiver 9a could be capable of emitting and receiving infrared waves. Cue receiver 19 could alternately comprise electrical contacts that would cooperate with corresponding electrical contacts 9b. In one embodiment, cue receiver 19 could be a button to be engaged by an automated finger device (the cue emitter 9b) in a slot of the data exchange device in which portable electronic device 10 is to be inserted. In any event, cue receiver 19 represents any suitable structure capable of receiving an activation cue from data exchange device 9', for indicating a data exchange opportunity between portable electronic device 10' and data exchange device 9'.

According to another embodiment, the data exchange system of the invention may be used to control data conveyance within a resident portable electronic device in a transaction wherein data will either be conveyed towards a first portable device transceiver to be communicated to an external data exchange device for example through a direct link, or towards a second portable device transceiver for downloading information towards a second external data exchange device such as a server or a remote portable electronic device. Herein, the expressions "resident" and "remote" are used to differentiate two portable electronic devices wherein one is remote relative to the so-called resident portable electronic device.

Figure 4:
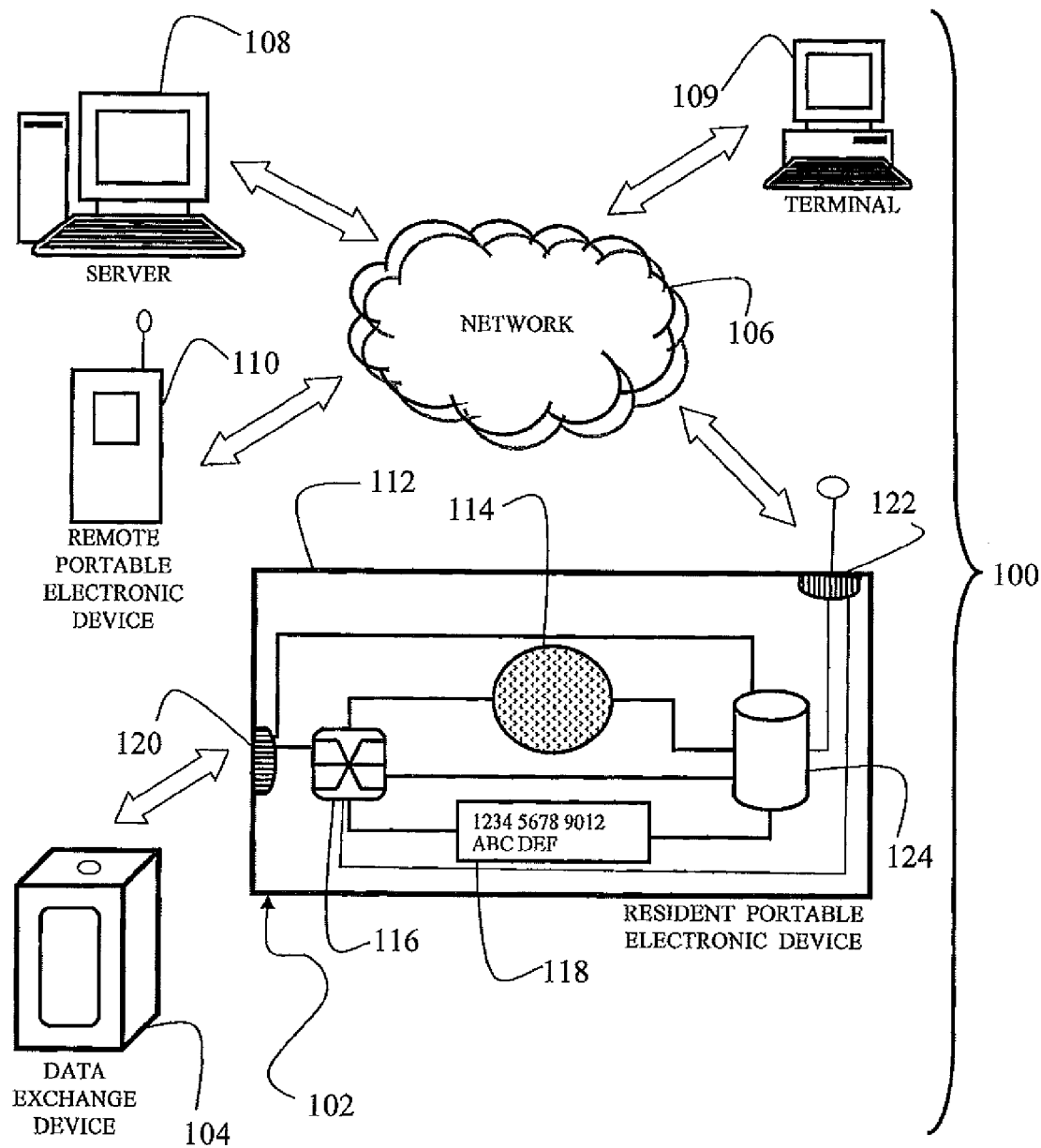
FIG. 4 is a schematic view of a data exchange system according to another embodiment of the present invention, showing a resident portable electronic device, a data exchange device, a network, a server, a terminal and a remote portable electronic device, further suggesting with allows the communication links being established between these different elements of the data exchange system.

FIG. 4 shows one way to carry out this embodiment of the invention. In FIG. 4, a data exchange system 100 comprises a user-owned resident portable electronic device 102 that may communicate either with a first data exchange device 104 or with a is second data exchange device 108, 109 or 110. The second data exchange device may be server 108, a terminal 109, a remote portable electronic device 110 or any other suitable remote electronic communication apparatus.

In one embodiment portable electronic device 102 will communicate with data exchange device 104 through a direct link, for example in a proximity transaction wherein devices 102 and 104 are physically close to one another; while portable electronic device 102 will communicate with second data exchange device 108, 109 or 110 through a communication network 106 wherein devices 102 and 108, 109 or 110 may be physically distant from one another.

Resident portable electronic device 102 is similar to portable electronic device 10 in many aspects, and comprises a main body 112 on which are operatively mounted a control device 114, an electronic circuit 116, a display screen 118, a first transceiver 120, a second transceiver 122 and power means 124. Portable electronic device 102 may be for example a cellular phone, a personal digital assistant (PDA), or any other suitable portable electronic device.

The electronic circuit 116 is similar to that of portable electronic device 10, including a central unit cooperating with a memory unit and an I/O controller having I/O ports; and a data forwarding switching element capable of alternate data conveyance operations responsive to reception or absence of an activation cue. The switching element may indeed be in either one of a first state when portable electronic device 102 has received the activation cue, or a second state in the absence of the activation cue. The first state may also be called the activated state and the second state may also be called the inactive state.

Control device 114 is similar to that of portable electronic device 10 and may include one or more control elements that, when sequentially activated, will issue an invariable command. For example control device may include a single button, a keypad wherein a personal identification number (PIN) code may be entered, a combination thereof or any other suitable control device.

Display screen 118 is similar to that of portable electronic device 10 and may include a touch screen for allowing user input through display screen 118.

First transceiver 120 is similar to transceiver 18 described in the portable electronic device 10 of the aforementioned embodiment and includes a cue receiver and a data transceiver. According to the present invention, the data transceiver and cue receiver could alternately be formed as two distinct data communication devices as shown in the embodiment of FIG. 3.

Power means 124 is similar to that of portable electronic device 10 and is connected to control device 114, electronic circuit 116, display screen 118 and first and second transceivers 120, 122. Generally, power means 124 provides power to portable electronic device 102 and all of its components that require power.

The second transceiver 122 of portable electronic device 102 is connected to electronic circuit 116 and more particular to the I/O controller so as to allow the data forwarding switching element to selectively control data conveyance towards second transceiver 122 as described in further detail hereinafter. Second transceiver 122 can be any suitable emitting and receiving device capable of communication with network 106, such as transceivers found on cellular phones known in the art.

Network 106 may be for example the Internet or any other suitable data exchange communication network that may include operative communication protocols. The electronic circuit 116 of portable electronic device 102 may be equipped with suitable resident network interface applications such as WEB or WAP (Wireless Application Protocol) applications, including WEB browsers or the like, in order to communicate through transceiver 122 and network 106 with a remote server 108 and/or a remote terminal 109 and/or a remote portable device 110 and/or any other suitable remote electronic apparatus.

Server 108 includes a computer and may be a financial institution server wherein financial transactions including financial data such as amounts of money and amounts of promotional points (Air Miles® or the like), and user data such as account numbers and other user identification data, together with any other suitable information, may be processed.

Terminal 109 includes a computer and may be a wireless or wired terminal. Terminal 109 may be owned by an individual or a company.

Remote portable electronic device 110 may be similar or different than resident portable electronic device 102. It may be for example a cellular phone, a PDA or any other suitable portable electronic device capable of wireless connection to network 106.

In use, portable electronic device 102 can be used to accomplish data conveyance operations within data exchange system 100. In this method for data exchange, data will be conveyed to either one of the first and second data transceivers 120, 122 depending on the whether the switching element comprised within electronic circuit 116 is in a first state or a second state, respectively.

More particularly, the method for data exchange with portable electronic device 102 comprises the step of awaiting for an activation cue to be received at the cue receiver included in data transceiver 120 (although as noted above the cue receiver could also be distinct). The first data exchange device 104 is capable of sending an activation cue, either a continuously emitted activation cue which is readable within a determined physical distance from data exchange device 104, a pulse cue which is emitted at determined time intervals or a punctual cue which is selectively emitted one or more times tinder certain circumstances.

If an activation cue is received by the portable electronic device 102 cue receiver, the switching element within electronic circuit 116 will be assigned its first state. This means that if it is already in its first state, it will remain as such; while if it is in another state, it will be switched to its first state. If no activation cue is received by the portable electronic device 102 cue receiver, the switching element within electronic circuit 116 will be assigned its second state. This means that if it is already in its second state, it will remain as such; while if it is in another state, it will be switched to its second state.

The method also comprises selectively triggering control device 114 to issue an invariable activation command. As noted above, this may be accomplished by entering a PIN code, pressing an authorization button, entering a PIN code AND pressing on an authorization button, or the like.

Upon control device 114 having been triggered, if the switching element is in its first state, the method then comprises forwarding first data to first transceiver 120 for initiating a data exchange operation with first external data exchange device 104.

However, if the switching element is in its second state, which is the case if no activation cue has been received, the method then instead comprises forwarding second data to second transceiver 122 for initiating a data exchange operation with a second external data exchange device.

In one embodiment of the invention, the method further comprises the following step before the step of forwarding first data to first transceiver 120 if the switching element is in its first state: forwarding third data to display screen 118, the third data being representative of the content of the first data. The third data being representative of the first data means that the third data may indicate the type, nature or content of data included in the first data, may include a portion of the data included in the first data, or may literally be identical to the first data. Alternately or additionally, fourth data may be forwarded to display screen 118 before the second data is forwarded to second transceiver 122. This fourth data is representative of the content of the second data.

It is further envisioned that, after the step of forwarding third data to the display screen 118, the step of forwarding the first data to first transceiver 120 will only occur if an authorization command is inputted through a user confirmation input device. This input device may be control device 114, or it may be another input device entirely such as for example a command on a touch screen (display screen 118) or any other suitable input device.

Likewise, it is also envisioned that, after the step of forwarding fourth data to the display screen 118, the step of forwarding the second data to second transceiver 122 will only occur if an authorization command is inputted through a user confirmation input device.

In one embodiment, first data transceiver 120 is a proximity transceiver that allows data transmission within a limited range, such as within several meters for example. The step of forwarding first data to first transceiver 120 is then for initiating a wireless data exchange operation with a proximate first external data exchange device 104 through a direct link. In such a case, first data exchange device 104 may also be a proximity device allowing data exchange within a limited range through a corresponding direct link.

In one embodiment, second data transceiver 122 is a communication network transceiver and the step of forwarding second data to second transceiver 122 is for initiating a wireless data exchange operation through a communication network with one of a remote portable electronic device, a remote server, a remote terminal and a combination thereof.

According to one embodiment of the invention, the first and second data are identical. Yet in another embodiment of the invention, the first, second, third and fourth data are identical.

One way to carry out the present invention is within a financial transaction. More particularly, portable electronic device 102 may be used to accomplish a financial transaction through one of different means as described hereinafter.

If portable electronic device 102 is close to a merchant data exchange device 104 and initiates a transaction through the communication thus established with data exchange device 104, initial transaction data is first communicated between portable electronic device 102 and data exchange device 104. This initial transaction data may include an offer for wares and services, the choice by the user of the portable electronic device 102 of a particular ware or service to buy, and the price of the ware or service being communicated to the user of portable electronic device 102. This initial transaction data may be communicated through portable electronic device 102, or not, both for the information provided to the user of portable electronic device 102 and to the merchant.

At one point, the user of portable electronic device 102 will be asked to pay an amount for his ware or service. This amount may be displayed on display screen 118. The user must authorize the transaction by using control device 114, which may include entering a PIN code. Once the control device 114 is triggered, it will issue an invariable activation command. If the merchant data exchange device 104 has sent an activation cue to portable electronic device 102, the electronic circuit switching element will react to this activation cue by being assigned its first state whereby the triggering of control device 114 will yield a first data conveyance operation in the form of user data being transferred from electronic circuit 116 to first transceiver 120 and then to data exchange device 104. The user data may include for example a credit card number, a debit card number, a promotional point account number, a bank account number, user name and address, account or card expiration dates, electronic money; or any other user data including user identification data and/or user financial data. The merchant data exchange device 104, with this user data, may then complete the transaction, including sending an optional confirmation back to portable electronic device 102, according to user and transaction data management methods known in the art.

Alternately, if portable electronic device 102 is not close to a merchant data exchange device 104, its user may still initiate a transaction through a communication established with a remote data exchange device such as remote portable electronic device 110, remote server 108 or remote terminal 109. This communication with a remote data exchange device 108, 109, 110 may be accomplished through a communication network 106 such as the Internet and may require that electronic circuit 116 be properly equipped with user interface software such as web browsers and the like and security software, as known in the art.

In any event, initial transaction data is first communicated between portable electronic device 102 and the remote data exchange device 108, 109, 110. This initial transaction data may include an offer for wares and services, the choice by the user of the portable electronic device of a particular ware or service to buy, and the price of the ware or service being communicated to the user of portable electronic device 102 through portable electronic device 102.

At one point, the user of portable electronic device 102 will be asked to pay an amount for his ware or service. This amount will be displayed on display screen 118. The user must authorize the transaction by using control device 114, which may include entering a PIN code. Once the control device 114 is triggered, it will issue the above-mentioned invariable activation command. Since no activation cue is detected by portable electronic device 102 in the absence of a proximate data exchange device 104 emitting such an activation cue, the electronic circuit switching element will react to this absence of an activation cue by being assigned its second state whereby the triggering of control device 114 will yield a second data conveyance operation in the form of user data being transferred from electronic circuit 116 to second transceiver 122 and then to remote data exchange device 108, 109, 110. The merchant remote data exchange device 108, 109, 110, with this user data, may then complete the transaction, including sending an optional confirmation back to portable electronic device 102.

In any of the two case scenarios mentioned in the above-mentioned financial transaction example, the user data is conveyed from electronic circuit 116 to the first or the second data transceiver 120, 122 depending on the state of the switch element which is itself controlled by the electronic circuit responsively to the reception or absence of an activation cue. In both cases however, the user data conveyance is responsive to the same, invariable activation command being issued once the control device 114 has been triggered.

This is particularly advantageous since the user need not vary his actions depending on what type of transaction he is accomplishing: be it a transaction with a proximity data exchange device 104 or a transaction over the Internet, he still authorizes the transaction the same way and the appropriate data conveyance operation then occurs.

For example, the data conveyance can be the transmittal of a credit card number. In such a case, the user of portable electronic device 102 could avoid having to type in his credit card number when a transaction occurs, if this number is stored in the memory of electronic circuit 116. When a transaction occurs, notwithstanding if the transaction occurs through an Internet access or with a proximate data exchange device 104, triggering control device 114 would still issue the same, invariable activation command to transfer the credit card number, with the destination of the credit card number depending on whether or not an activation cue has been received. If an activation cue was received, then the credit card number would be forwarded to the first data transceiver to be downloaded through a direct link to data exchange device 104; however if no activation cue has been received, then the credit card number would be forwarded to the second data transceiver 122 to be downloaded through the Internet access to the remote data exchange device 108, 109, 110 that portable electronic device 102 is communicating with.

It should be noted that portable electronic device 102 could hold more than one user accounts and payment methods, including several credit card numbers, promotional point accounts, bank accounts, electronic money, and the like. Before the authorization of a particular transaction occurs by triggering the control device 114, the user could choose the appropriate account or payment method with the data being conveyed then depending on the account or payment method being chosen. Alternately, to portable electronic device 102 could include a system for automatically selecting a proper account or payment method including any suitable set of predetermined criteria such as user payment preferences, merchant payment acceptances and preferences, transaction type, merchant identification, and the like. The selection of user data could also vary depending on whether the transaction is going to be accomplished through a is direct link with first data exchange device 104 or through the Internet with a second data exchange device 108, 109, 110. The system for automatically selecting a proper account or payment method could further include having information being provided by the merchant to the portable electronic device to either force or restrict the selection.

In any event, one or more additional authorizations could be required between the triggering of the control device 114 and the forwarding of the user data towards first or second transceiver 120, 122. More particularly, it is envisioned that upon the control device 114 being triggered to issue its invariable activation command, confirmation data would be forwarded from electronic circuit 116 to display screen 118 to be displayed thereon. This confirmation data could be identical to the user data, or not. For example, the confirmation data could include the credit card number that the portable electronic device 102 automatically selected as a payment mode for a particular transaction, so that the user may confirm that this is indeed the payment method that he wants to use before sending this information to the first or second transceiver 120, 122. Alternately, the confirmation data could include only part of the credit card number: the credit card number appearing on display screen 118 could be partly concealed with stars or other concealing characters while only part of the credit card number such as the last four numbers are actually displayed. Or; the credit card number could be entirely concealed, the display screen then displaying for example a number of stars equal to the number of characters in the credit card number: in such a case, the information displayed on the display screen 118 remains relevant since the user of portable electronic device 120 is informed that a credit card number is going to be transferred, even if that number is unreadable. An authorization command would then be awaited, the authorization command to be inputted through a user confirmation input device before forwarding the user data to the first or second data transceiver 120, 122. This user confirmation input device could be control device 114 which would be triggered yet again, or alternately another input device such as a touch screen (display to screen 118) which could issue an authorization command when triggered.

In the case where the transaction occurs with a proximity data exchange device 104 the user confirmation input device could include a proximity trigger device that establishes wireless contact to download information when portable electronic device 102 is brought within a determined maximum distance from data exchange device 104. In other words, instead of being accomplished with a confirmation button or the like element on portable electronic device 102, the authorization command would occur automatically when portable electronic device 102 is brought by its user within a certain determined maximum distance from data exchange device 104, the proximity trigger device then allowing the downloading of the first data to occur from portable electronic device 102 to data exchange device 104. The user of course being aware of this feature on his portable electronic device 102, the action of moving portable electronic device 102 would be made voluntarily to complete the data conveyance operation from first transceiver 120 to data exchange device 104.

Any further modification, which does not deviate from the scope of the present invention, is considered to be included therein.

The invention claimed is:

1. A cellular phone, comprising:
   an electronic circuit capable of storing data therein, capable of processing data, and capable of data input and output;

a user-triggered control device operatively linked to said electronic circuit, said user-triggered control device configured to be operated by a user via one of a button, a keypad, a tactile screen, and a biometric parameter detector, and after being operated issue an invariable activation command, with said invariable activation command being issued when said control device is selectively triggered by the user;

a first data transceiver operatively linked to said electronic circuit, said first data transceiver being for exchanging data between said electronic circuit and a first external data exchange device over a first communication link;

a second data transceiver operatively linked to said electronic circuit, said second data transceiver being for exchanging data between said electronic circuit and a second external data exchange device over a second communication link that is distinct from said first communication link;

a cue receiver operatively linked to said electronic circuit for receiving an activation cue from a source external to said cellular phone;

a data conveyance switching element operatively linked to said electronic circuit, said switching element being assigned a first state upon an activation cue having been received by said cue receiver, and being assigned a second state when no activation cue was received by said cue receiver; and power means for providing power to said portable electronic device cellular phone;

wherein upon said control device being selectively triggered by the user to issue said invariable activation command:

if said switching element is in said first state, a first data conveyance operation will be initiated through the instrumentality of said first data transceiver for sending data from said electronic circuit to the first external data exchange device over said first communication link; and if said switching element is in said second state, a second data conveyance operation will be initiated through the instrumentality of said second data transceiver for sending data from said electronic circuit to the second external data exchange device over said second communication link.

2. A cellular phone as defined in claim 1, further comprising a display screen operatively linked to said electronic circuit.

3. A cellular phone as defined in claim 1, wherein said first data transceiver includes said cue receiver.

4. A cellular phone as defined in claim 1, wherein said control device is one of a manually activated button, a keypad for receiving a PIN code, a biometric parameter detector and a combination thereof.

5. A cellular phone as defined in claim 1, wherein said electronic circuit includes said switching element.

6. A cellular phone as defined in claim 5, wherein said electronic circuit comprises a microchip, and wherein said switching element is a series of instructions programmed onto said microchip.

7. A cellular phone as defined in claim 1, wherein said switching element comprises a logical circuit.

8. A cellular phone as defined in claim 1, wherein said first data transceiver comprises a proximity transceiver for accomplishing a wireless data exchange with a first external data exchange device through a direct link representing said first communication link where the cellular phone is conveyed toward a close proximity of the first external data exchange device and within a range to receive the activation cue to initiate the wireless data exchange.

9. A cellular phone as defined in claim 8, wherein said second data transceiver comprises a communication network transceiver for wireless communication through a communication network that represents said second communication link, with one of a remote portable electronic device, a remote server, a remote terminal and a combination thereof.

10. A cellular phone comprising:
an electronic circuit capable of storing data therein, capable of processing data, and capable of data input and output;

a user-triggered control device operatively linked to said electronic circuit, said user-triggered control device configured to be operated by a user via one of a button, a keypad, a tactile screen, and a biometric parameter detector, and after being operated issue an invariable activation command, with said invariable activation command being issued when said control device is triggered by the user;

first and second data conveyance operations programmed in said electronic circuit;

a first data transceiver operatively linked to said electronic circuit, said first data transceiver being operable for data exchange over a first communication link;

a second data transceiver operably linked to said electronic circuit, said second data transceiver being operable for data exchange over a second communication link that is distinct from said first communication link;

a cue receiver operatively linked to said electronic circuit for receiving an activation cue from a source external to said cellular phone; and power means, for providing power to said cellular phone;

wherein upon said control device being selectively triggered by the user to issue said invariable activation command:

if an activation cue was received by said cue receiver, said electronic circuit will accomplish said first data conveyance operation to convey data from said electronic circuit to said first data transceiver for transmitting data through said first data transceiver; and if no activation cue was received by said cue receiver, said electronic circuit will accomplish said second data conveyance operation to convey data from said electronic circuit to said second data transceiver for transmitting data through said second data transceiver.

11. A data exchange system comprising:
a first data exchange device;
a second data exchange device; and
a cellular phone, including:
an electronic circuit capable of storing data therein, capable of processing data, and capable of data input and output;

a user-triggered control device operatively linked to said electronic circuit, said user-triggered control device configured to be operated by a user via one of a button, a keypad, a tactile screen, and a biometric parameter detector, and after being operated issue an invariable activation command, with said invariable activation command being issued when said control device is selectively triggered by the user;

a first data transceiver operatively linked to said electronic circuit, said first data transceiver being for exchanging data between said electronic circuit and said first data exchange device through a direct link;

a second data transceiver operatively linked to said electronic circuit, said second data transceiver being for exchanging data between said electronic circuit and said second data exchange device through a communication network that is distinct from said direct link;

a cue receiver operatively linked to said electronic circuit for receiving an activation cue from said first data exchange device;

a data conveyance switching element operatively linked to said electronic circuit, said switching element being assigned a first state upon an activation cue having been received by said cue receiver, and being assigned a second state when no activation cue was received by said cue receiver; and power means for providing power to said cellular phone;

wherein upon said control device being selectively triggered by the user to issue said invariable activation command:

if said switching element is in said first state, a first data conveyance operation will be initiated through the instrumentality of said first data transceiver for exchanging data between said electronic circuit and the first external data exchange device;

if said switching element is in said second state, a second data conveyance operation will be initiated through the instrumentality of said second data transceiver for exchanging data between said electronic circuit and the second external data exchange device.

12. A method for data conveyance with a cellular phone of the type comprising: an electronic circuit capable of storing data therein, capable of processing data, and capable of data input and output, a user-triggered control device operatively linked to said electronic circuit, said user-triggered control device configured to be operated by a user via one of a button, a keypad, a tactile screen, and a biometric parameter detector, and after being operated issue an invariable activation command, first and second data transceivers operatively linked to said electronic circuit, a cue receiver operatively linked to said electronic circuit, a data conveyance switching element operatively linked to said electronic circuit and capable of being in either one of a first and a second state, and power means for providing power to said cellular phone, said method comprising the steps of:

awaiting for an activation cue to be received at said cue receiver;

if an activation cue is received at said cue receiver, assigning said first state to said switching element, while if no activation cue is received at said cue receiver, assigning said second state to said switching element; and a user selectively triggering said control device to issue an invariable activation command whereby:

if said switching element is in said first state, forwarding first data to said first data transceiver for initiating a data exchange operation with a first external data exchange device over a first communication link; and if said switching element is in said second state, forwarding second data to said second data transceiver for initiating a data exchange operation with a second external data exchange device that is distinct from said first communication link.

13. A method as defined in claim 12, further comprising the following step before the step of forwarding first data to said first data transceiver for initiating a data exchange operation with a first external data exchange device:

forwarding third data to and displaying said third data on a display screen provided on said cellular phone, wherein said third data is representative of the content of said first data.

14. A method as defined in claim 13, wherein after the step of forwarding said third data to the display screen, the method comprises the following step:

awaiting for an authorization command to be inputted through a user confirmation input device provided on said cellular phone before forwarding said first data to said first data transceiver.

15. A method as defined in claim 12, wherein said first and second data are identical.

16. A method as defined in claim 12, wherein said first data transceiver is a proximity transceiver and the step of forwarding said first data to said first transceiver is for initiating a wireless data exchange operation with a proximate first external data exchange device through a direct link representing said first communication link where the cellular phone is conveyed toward a close proximity of the first external data exchange device and within a range to receive the activation cue to initiate the wireless data exchange.

17. A method as defined in claim 12, wherein said second data transceiver is a communication network transceiver and the step of forwarding said second data to said second data transceiver is for initiating a wireless data conveyance operation through a communication network representing said second communication link, with one of a remote portable electronic device, a remote server, a remote terminal and a combination thereof.

18. A method as defined in claim 12, wherein the step of selectively triggering said control device to issue the invariable activation command comprises selectively triggering one of the manually activated button, the keypad for receiving a PIN code, the biometric parameter detector and a combination thereof.

19. A method for data conveyance with a cellular phone of the type comprising: an electronic circuit capable of storing data therein, capable of processing data, and capable of data input and output, a control device operatively linked to said electronic circuit, first and second data transceivers operatively linked to said electronic circuit, a cue receiver operatively linked to said electronic circuit, a data conveyance switching element operatively linked to said electronic circuit and capable of being in either one of a first and a second state, and power means for providing power to said cellular phone, said method comprising the steps of:

awaiting for an activation cue to be received at said cue receiver;

if an activation cue is received at said cue receiver, assigning said first state to said switching element, while if no activation cue is received at said cue receiver, assigning said second state to said switching element; and selectively triggering said control device to issue an invariable activation command whereby:

if said switching element is in said first state, forwarding first data to said first data transceiver for initiating a data exchange operation with a first external data exchange device over a first communication link; and if said switching element is in said second state, forwarding second data to said second data transceiver for initiating a data exchange operation with a second external data exchange device over a second communication link that is distinct from said first communication link;

wherein said method further comprises the following steps before the step of forwarding first data to said first data transceiver for initiating a data exchange operation with a first external data exchange device:

forwarding third data to and displaying said third data on a display screen provided on said cellular phone, wherein said third data is representative of the content of said first data; and awaiting for an authorization command to be inputted through a user confirmation input device provided on said cellular phone before forwarding said first data to said first data transceiver; and wherein said method further comprises the following steps before the step of forwarding second data to said second data transceiver for initiating a data exchange operation with a second external data exchange device:

forwarding fourth data to and displaying said fourth data on said display screen, wherein said fourth data is representative of the content of said second data; and awaiting for an authorization command to be inputted through said user confirmation input device before forwarding said second data to said second data transceiver.

20. A method as defined in claim 19, wherein said control device includes said user confirmation input device.

\* \* \* \* \*